United States Patent
Min et al.

(10) Patent No.: US 10,880,492 B2
(45) Date of Patent: Dec. 29, 2020

(54) HDR IMAGE CAPTURING DEVICE AND CONTROL METHOD THEREFOR

(71) Applicant: LG ELECTRONICS INC., Seoul (KR)

(72) Inventors: Kyungyeon Min, Seoul (KR); Wonkyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 104 days.

(21) Appl. No.: 16/329,083

(22) PCT Filed: Mar. 8, 2017

(86) PCT No.: PCT/KR2017/002496
§ 371 (c)(1),
(2) Date: Feb. 27, 2019

(87) PCT Pub. No.: WO2018/043853
PCT Pub. Date: Mar. 8, 2018

(65) Prior Publication Data
US 2019/0230273 A1    Jul. 25, 2019

(30) Foreign Application Priority Data

Sep. 5, 2016  (KR) .................. 10-2016-0114130

(51) Int. Cl.
*G06K 9/00* (2006.01)
*H04N 5/235* (2006.01)
(Continued)

(52) U.S. Cl.
CPC ............ *H04N 5/2355* (2013.01); *G06T 5/00* (2013.01); *H04N 5/232* (2013.01); *H04N 5/235* (2013.01);
(Continued)

(58) Field of Classification Search
None
See application file for complete search history.

(56) References Cited

U.S. PATENT DOCUMENTS

2009/0086074 A1    4/2009  Li et al.
2009/0295706 A1 *  12/2009 Feng ..................... G09G 3/342
                                                   345/102
(Continued)

FOREIGN PATENT DOCUMENTS

KR    10-2013-0090904 A    8/2013
KR      10-1306780 B1      9/2013
(Continued)

*Primary Examiner* — Hadi Akhavannik
(74) *Attorney, Agent, or Firm* — Birch, Stewart, Kolasch & Birch, LLP

(57) ABSTRACT

Provided are a high dynamic range (HDR) image capturing device, which is capable of capturing an HDR image optimized in various situations, and a control method therefor. The HDR image capturing device comprises: an image acquisition unit for capturing and acquiring a predetermined image; a brightness analysis unit for analyzing the brightness of the acquired image; a color analysis unit for analyzing the color of the acquired image; a focus analysis unit for analyzing the focus of the acquired image; and a control unit for controlling the image acquisition unit, the brightness analysis unit, the color analysis unit, and the focus analysis unit according to an HDR capturing mode, which is to be inputted, wherein the control unit can: check whether the image acquisition unit supports the HDR when the HDR capturing mode is input; control the image acquisition unit to perform HDR image capturing, and perform HDR image processing on the captured image when the image acquisition unit supports the HDR; and control the brightness analysis unit, the color analysis unit, and the focus analysis unit so as to analyze the brightness, color, and focus of the acquired image and perform HDR image processing on the (Continued)

captured image according to the analyzed brightness, color, and focus when the image acquisition unit does not support the HDR.

20 Claims, 15 Drawing Sheets

(51) Int. Cl.
    *H04N 5/232*     (2006.01)
    *H04N 9/73*     (2006.01)
    *G06T 5/00*     (2006.01)
    *H04N 5/262*     (2006.01)

(52) U.S. Cl.
    CPC ............... *H04N 5/262* (2013.01); *H04N 9/73* (2013.01); *G06T 5/007* (2013.01)

(56) References Cited

U.S. PATENT DOCUMENTS

| | | | |
|---|---|---|---|
| 2011/0149095 A1 | 6/2011 | Kikuchi | |
| 2013/0050519 A1* | 2/2013 | Lee | H04N 5/2355 348/222.1 |
| 2015/0022712 A1* | 1/2015 | Koishi | G03B 13/36 348/352 |
| 2015/0271405 A1* | 9/2015 | Lameer | H04N 5/23245 348/222.1 |

FOREIGN PATENT DOCUMENTS

| | | |
|---|---|---|
| KR | 10-1629825 B1 | 6/2016 |
| KR | 10-1633377 B1 | 7/2016 |

* cited by examiner

HDR IMAGE CAPTURING DEVICE AND CONTROL METHOD THEREFOR

CROSS-REFERENCE TO RELATED APPLICATIONS

This application is the National Phase of PCT International Application No. PCT/KR2017/002496, filed on Mar. 8, 2017, which claims priority under 35 U.S.C. 1 19(a) to Korean Patent Application No. 10-2016-0114130, filed in the Republic of Korea on Sep. 5, 2016, all of which are hereby incorporated by reference herein in their entireties.

TECHNICAL FIELD

The present invention relates to an HDR image capturing apparatus, and more particularly, to an apparatus for capturing a High Dynamic Range (HDR) image optimized even in various situations and control method thereof.

BACKGROUND ART

Generally, a dynamic range means a range of luminance that can be represented by an image captured by a camera.

Since a dynamic range of a camera is considerably smaller than that of human, it can be observed that the expressive power of an image captured by a camera is noticeably poorer than that of a human-viewable image.

Recently, in order to acquire an HDR image of a high dynamic range, a camera having a high-end image sensor or a technique of capturing multiple images and then synthesizing them was developed.

However, the related art has the following problems. First of all, it is unable to acquire an HDR image using a low-end camera incapable of supporting an HDR image capturing function. The scheme of synthesizing a multitude of images has various technical limits in memory, current consumption, synthesis speed, etc.

Accordingly, the demand for developing an HDR image capturing device capable of optimized High Dynamic Range (HDR) image capturing in various situations is rising.

DISCLOSURE OF THE INVENTION

Technical Task

One technical task of the present invention is to solve the aforementioned problems and other problems. Another technical task of the present invention is to provide an apparatus for capturing an HDR image and control method thereof, by which an optimal HDR image can be implemented irrespective of a presence or non-presence of HDR support.

Another technical task of the present invention is to provide an apparatus for capturing an HDR image and control method thereof, by which HDR image implementing speed can be increased and power consumption can be minimized in a manner of determining the number of image frames for HDR image implementation according to a camera movement extent.

Another technical task of the present invention is to provide an apparatus for capturing an HDR image and control method thereof, by which an optimal HDR image can be implemented in a manner of removing an image frame having a big motion after measuring a motion difference between captured image frames.

Another technical task of the present invention is to provide an apparatus for capturing an HDR image and control method thereof, by which an optimal HDR image can be implemented in a manner of determining an optimal setting value by analyzing brightness, color and focus of a preview image and then reanalyzing a captured image according to the determined setting value.

Another technical task of the present invention is to provide an apparatus for capturing an HDR image and control method thereof, by which user convenience can be provided in a manner of displaying an HDR processing mode setting window including a multitude of HDR items sorted by HDR processing manners on a display screen.

Further technical task of the present invention is to provide an apparatus for capturing an HDR image and control method thereof, by which user convenience can be provided in a manner of storing all HDR setting informations according to HDR image processing results per user and then providing HDR recommendation information to a user based on the stored informations.

Technical tasks obtainable from the present invention are non-limited by the above-mentioned technical task(s). And, other unmentioned technical tasks can be clearly understood from the following description by those having ordinary skill in the technical field to which the present invention pertains.

Technical Solutions

In one technical aspect of the present invention, provided herein is an apparatus for capturing High Dynamic Range (HDR) images, the apparatus including an image acquiring unit capturing to acquire a prescribed image, a brightness analyzing unit analyzing a brightness of the acquired image, a color analyzing unit analyzing a color of the acquired image, a focus analyzing unit analyzing a focus of the acquired image, and a controller configured to control the image acquiring unit, the brightness analyzing unit, the color analyzing unit, and the focus analyzing unit according to an inputted HDR capturing mode, wherein if the HDR capturing mode is inputted, the controller is further configured to check whether the image acquiring unit supports HDR, wherein if the image acquiring unit supports the HDR, the controller is further configured to control the image acquiring unit to perform HDR image capturing and perform an HDR image processing on the captured image, and wherein if the image acquiring unit does not support the HDR, the controller is further configured to control the brightness analyzing unit, the color analyzing unit and the focus analyzing unit to analyze brightness, color and focus of the acquired image and perform the HDR image processing on the captured image according to the analyzed brightness, color and focus.

In another technical aspect of the present invention, provided herein is a method of controlling an HDR image capturing device, the method including checking whether an HDR capturing mode is inputted, if the HDR capturing mode is inputted, checking whether an image acquiring unit supports HDR, if the image acquiring unit does not support the HDR, analyzing a brightness, color and focus of an acquired preview image, determining setting values for the brightness, color and focus based on the analyzed information, capturing an image according to the determined setting values, re-analyzing the captured image, and performing HDR image processing on the re-analyzed image.

Advantageous Effects

An apparatus for capturing an HDR image and control method thereof according to the present invention provide the following features and/or effects.

According to at least one of embodiments of the present invention, since an optimal HDR image can be implemented irrespective of a presence or non-presence of HDR support, the present invention is applicable to low-end image capturing devices.

According to at least one of embodiments of the present invention, HDR image implementing speed can be increased and memory and power consumption can be minimized, in a manner of determining the number of image frames for HDR image implementation according to a camera movement extent.

According to at least one of embodiments of the present invention, an optimal HDR image can be implemented in a manner of removing an image frame having a big motion after measuring a motion difference between captured image frames.

According to at least one of embodiments of the present invention, an optimal HDR image can be implemented in a manner of determining an optimal setting value by analyzing brightness, color and focus of a preview image and then reanalyzing a captured image according to the determined setting value.

According to at least one of embodiments of the present invention, since HDR image implementation is enabled automatically or manually in a manner of displaying an HDR processing mode setting window including a multitude of HDR items sorted by HDR processing manners on a display screen, user convenience can be provided.

According to at least one of embodiments of the present invention, user convenience can be provided in a manner of storing all HDR setting informations according to HDR image processing results per user and then providing HDR recommendation information to a user based on the stored informations.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BEST MODE FOR INVENTION

Figure 1:
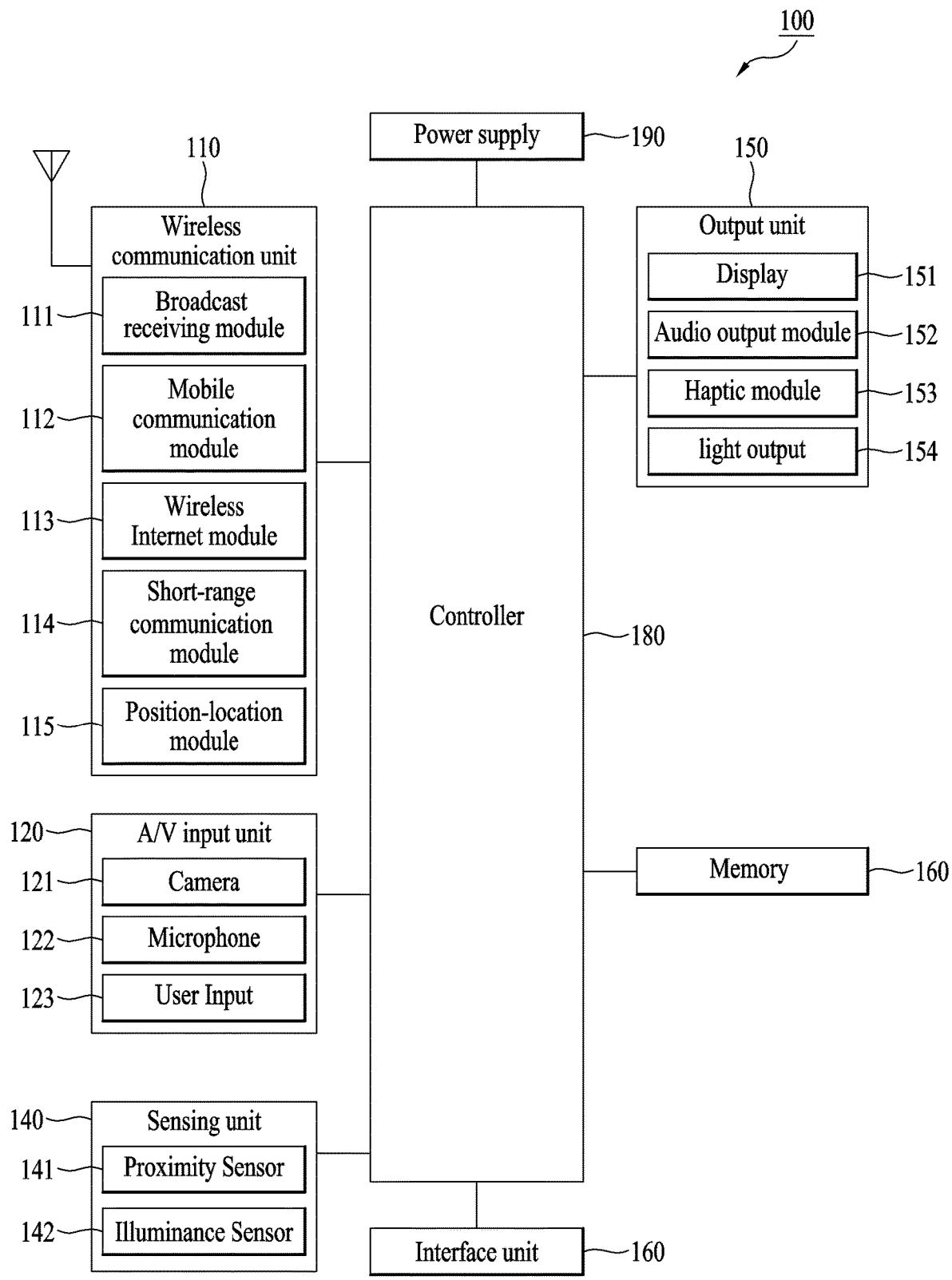
FIG. 1 is a block diagram to describe an HDR image capturing device related to the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with or to" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

HDR image capturing device presented herein may be implemented using a variety of different types of terminals. Examples of such terminals include cellular phones, smart phones, user equipment, laptop computers, digital broadcast terminals, Personal Digital Assistants (PDAs), Portable Multimedia Players (PMPs), navigators, slate PCs, tablet PCs, ultra books, wearable devices (for example, smart watches, smart glasses, Head Mounted Displays (HMDs)), and the like.

By way of non-limiting example only, further description will be made with reference to particular types of HDR image capturing device. However, such teachings apply equally to other types of terminals, such as those types noted above. In addition, these teachings may also be applied to stationary terminals such as digital TV, desktop computers, digital signage and the like.

FIG. 1 is a block diagram for explaining an HDR image capturing device related to the present invention.

HDR image capturing device 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in The FIG. 1 is not a requirement, and that greater or fewer components may alternatively be implemented.

The wireless communication unit 110 typically includes one or more modules which permit communications such as wireless communications between the HDR image capturing device 100 and a wireless communication system, communications between the HDR image capturing device 100 and another HDR image capturing device, communications between the HDR image capturing device 100 and an external server. Further, the wireless communication unit 110 typically includes one or more modules which connect the HDR image capturing device 100 to one or more networks.

To facilitate such communications, the wireless communication unit 110 includes one or more of a broadcast receiving module 111, a mobile communication module 112, a wireless Internet module 113, a short-range communication module 114, and a position location module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the HDR image capturing device, the surrounding environment of the HDR image capturing device, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The HDR image capturing device 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the HDR image capturing device 100 and a user, as well as function as the user input unit 123 which provides an input interface between the HDR image capturing device 100 and the user.

The interface unit 160 serves as an interface with various types of external devices that can be coupled to the HDR image capturing device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the HDR image capturing device 100 may perform assorted control functions associated with a connected external device, in response to the external device being connected to the interface unit 160.

The memory 170 is typically implemented to store data to support various functions or features of the HDR image capturing device 100. For instance, the memory 170 may be configured to store application programs executed in the HDR image capturing device 100, data or instructions for operations of the HDR image capturing device 100, and the like. Some of these application programs may be downloaded from an external server via wireless communication. Other application programs may be installed within the HDR image capturing device 100 at time of manufacturing or shipping, which is typically the case for basic functions of the HDR image capturing device 100 (for example, receiving a call, placing a call, receiving a message, sending a message, and the like). It is common for application programs to be stored in the memory 170, installed in the HDR image capturing device 100, and executed by the controller 180 to perform an operation (or function) for the HDR image capturing device 100.

The controller 180 typically functions to control overall operation of the HDR image capturing device 100, in addition to the operations associated with the application programs. The controller 180 processes signals, data, information and the like inputted or outputted through the above-mentioned components and/or runs application programs saved in the memory 170, thereby processing or providing a user with appropriate information and/or functions.

The controller 180 may provide or process information or functions appropriate for a user by processing signals, data, information and the like, which are input or output by the various components depicted in FIG. 1, or activating application programs stored in the memory 170. Further, to execute the application programs, the control unit 180 may operate at least two of the components included in the HDR image capturing apparatus 100 as security information for transactions using a specific account, which are previously registered by the user of the HDR image capturing apparatus 100, in combination with each other.

The power supply unit 190 can be configured to receive external power or provide internal power in order to supply appropriate power required for operating elements and components included in the HDR image capturing device 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the HDR image capturing device according to various embodiments of the present invention mentioned in the following description. Moreover, the operations, controls or controlling methods of the HDR image capturing device can be embodied in the HDR image capturing device by running at least one or more application programs saved in the memory 170.

Hereinafter, before examining various embodiments implemented through the HDR image capturing device 100, the above-mentioned components will be described in more detail with reference to FIG. 1.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast management server generates a broadcast signal and/or broadcast-related information, and receives the transmitting server or the generated broadcasting signal and/or broadcasting related information, may indicate a server that transmits to a terminal. The broadcast signal includes a TV broadcast signal, a radio broadcast signal, and a data broadcast signal, as well as a TV broadcast signal or it is also possible to include a broadcast signal in which a data broadcast signal is combined with a radio broadcast signal.

The broadcast signal may be encoded according to at least one of the technical standards (or broadcasting system, for example, ISO, IEC, DVB) for transmitting and receiving digital broadcast signals. And the broadcast receiving module 111 can receive the digital broadcast signal using a method conforming to the technical standards defined in the technical standards.

The broadcast-related information may indicate a broadcast channel, a broadcast program, or information related to broadcast service provider. The broadcast-related information can also be provided through a mobile communication network. In this case, the mobile communication module 112 may receive the broadcast-related information.

The broadcast-related information includes, for example, a DMB (Digital Multimedia Broadcasting), EPG (Electronic Program Guide) or an ESG (Electronic Service Guide) of a DVB-H (Digital Video Broadcast-Handheld). The broadcast signal and/or broadcast related information received through the broadcast receiving module 111 may be stored in the memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the HDR image capturing device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the HDR image capturing device 100 and a wireless communication system, communications between the HDR image capturing device 100 and another HDR image capturing device 100, or communications between the HDR image capturing device 100 and a network where another HDR image capturing device 100 (or an external server) is located, via wireless area networks. One example of the wireless area networks is a wireless personal area networks.

In some embodiments, another HDR image capturing device (which may be configured similarly to HDR image capturing device 100) may be a wearable device, for example, a smart watch, a smart glass or a head mounted display (HMD), which is able to exchange data with the HDR image capturing device 100 (or otherwise cooperate with the HDR image capturing device 100). The short-range communication module 114 may sense or recognize the wearable device, and permit communication between the wearable device and the HDR image capturing device 100. In addition, when the sensed wearable device is a device which is authenticated to communicate with the HDR image capturing device 100, the controller 180, for example, may cause transmission of data processed in the HDR image capturing device 100 to the wearable device via the short-range communication module 114. Hence, a user of the wearable device may use the data processed in the HDR image capturing device 100 on the wearable device. For example, when a call is received in the HDR image capturing device 100, the user may answer the call using the wearable device. Also, when a message is received in the HDR image capturing device 100, the user can check the received message using the wearable device.

The position-location module 115 is generally configured to detect, calculate, derive or otherwise identify a position of the HDR image capturing device. As an example, the position-location module 115 includes a Global Position System (GPS) module, a Wi-Fi module, or both. If desired, the position-location module 115 may alternatively or additionally function with any of the other modules of the wireless communication unit 110 to obtain data related to the position of the HDR image capturing device. As one example, when the HDR image capturing device uses a GPS module, a position of the HDR image capturing device may be acquired using a signal sent from a GPS satellite. As another example, when the HDR image capturing device uses the Wi-Fi module, a position of the HDR image capturing device can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the HDR image capturing device.

The input unit 120 may be configured to permit various types of input to the HDR image capturing device 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the HDR image capturing device 100. As another example, the cameras 121 may be located in a stereoscopic arrangement to acquire left and right images for implementing a stereoscopic image.

The microphone 122 is generally implemented to permit audio input to the HDR image capturing device 100. The audio input can be processed in various manners according to a function being executed in the HDR image capturing device 100. If desired, the microphone 122 may include assorted noise removing algorithms to remove unwanted noise generated in the course of receiving the external audio.

The user input unit 123 is a component that permits input by a user. Such user input may enable the controller 180 to control operation of the HDR image capturing device 100. The user input unit 123 may include one or more of a mechanical input element (for example, a key, a button located on a front and/or rear surface or a side surface of the HDR image capturing device 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the HDR image capturing device at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the HDR image capturing device, surrounding environment information of the HDR image capturing device, user information, or the like. The controller 180 generally cooperates with the sending unit 140 to control operation of the HDR image capturing device 100 or execute data processing, a function or an operation associated with an application program installed in the HDR image capturing device based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the HDR image capturing device covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the HDR image capturing device 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the HDR image capturing device 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the HDR image capturing device 100. For example, the display unit 151 may display execution screen information of an application program executing at the HDR image capturing device 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

Generally, 3D stereoscopic images are composed of left image (left eye image) and right image). According to the way in which left and right images are combined into three-dimensional stereoscopic images, a top-down method in which left and right images are arranged vertically in one frame, method, a left-to-right (L-to-R) side-by-side method in which left and right images are arranged left and right in one frame, board (checker board) method, the left image and the right image are alternately arranged in a column unit or a row unit interlaced, and left and right images by time sequential (frame-by-frame) method.

In addition, the 3D thumbnail image is obtained from the left and right images of the original image frame a left-image thumbnail and a right-image thumbnail, respectively, and as they are combined and can be generated as one image. Generally, a thumbnail is a reduced image or a reduced still image. The generated left image thumbnail and right image the thumbnail is displayed on the screen by a depth corresponding to the parallax between the left and right images by displaying the difference between the left and right distances, it is possible to exhibit stereoscopic spatial feeling.

The left and right images required for the implementation of the three-dimensional image are processed by the stereoscopic processing unit and can be displayed on the stereoscopic display unit. The stereoscopic processing unit displays 3D images and the image of the extension point of time) from the left image and the right image, or a 2D image is inputted and converted into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the HDR image capturing device 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the HDR image capturing device 100.

An optical output module 154 can output a signal for indicating an event generation using light of a light source. Examples of events generated in the HDR image capturing device 100 may include message reception, call signal reception, a missed call, an alarm, a schedule notice, an email reception, information reception through an application, and the like.

A signal output by the optical output module 154 may be implemented in such a manner that the HDR image capturing device emits monochromatic light or light with a plurality of colors. The signal output may be terminated as the HDR image capturing device senses that a user has checked the generated event, for example.

The interface unit 160 serves as an interface for external devices to be connected with the HDR image capturing device 100. For example, the interface unit 160 can receive data transmitted from an external device, receive power to transfer to elements and components within the HDR image capturing device 100, or transmit internal data of the HDR image capturing device 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the HDR image capturing device 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the HDR image capturing device 100 is connected with an external cradle, the interface unit 160 can serve as a passage to allow power from the cradle to be supplied to the HDR image capturing device 100 or may serve as a passage to allow various command signals input by the user from the cradle to be transferred to the HDR image capturing device there through. Various command signals or power input from the cradle may operate as signals for recognizing that the HDR image capturing device is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The HDR image capturing device 100 may also be operated in relation to a network storage device that performs the storage function of the memory 170 over a network, such as the Internet.

The controller 180 may typically control the general operations of the HDR image capturing device 100. For example, the controller 180 may set or release a lock state for restricting a user from inputting a control command with respect to applications when a status of the HDR image capturing device meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 can receive external power or provide internal power and supply the appropriate power required for operating respective elements and components included in the HDR image capturing device 100. The power supply unit 190 may include a battery, which is typically rechargeable or be detachably coupled to the terminal body for charging.

Also, the power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Also, various embodiments can be implemented in the computer and similar recording materials using software, hardware and the combination of software and hardware.

Figure 2:
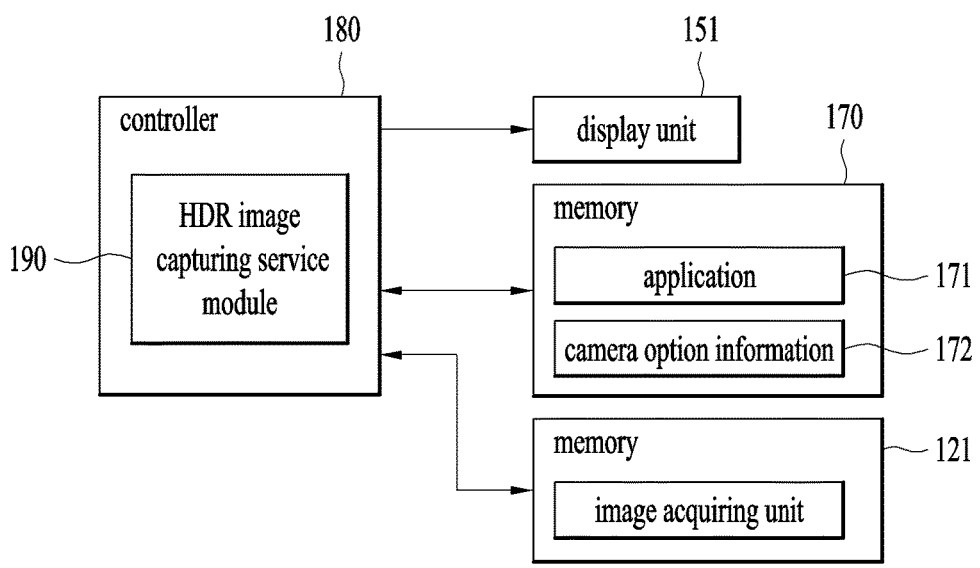
FIG. 2 is a block diagram of prescribed configuration modules of an HDR image capturing device according to one embodiment of the present invention.

FIG. 2 is a block diagram of prescribed configuration modules of an HDR image capturing device according to one embodiment of the present invention.

Referring to FIG. 2, an HDR image capturing device 100 according to one embodiment of the present invention includes a controller 180, a display unit 151, a memory 170 and a camera unit 121.

Here, the memory 170 can store an application 171 and option information of a camera. Although a single application 171 is shown in FIG. 2 for convenience, a plurality of applications may be stored in the memory 170. The application 171 may include a native application installed when the HDR image capturing device 100 is shipped or OS/firmware is upgraded. Or, the application 171 may include an application installed by being separately downloaded from an external server by a user of the HDR image capturing device 100.

One or a plurality of camera units 121 can be provided to the HDR image capturing device 100. The camera unit 121 can capture a prescribed image. Here, the camera unit 121 can have an image acquiring unit including a camera module capturing a prescribed image, an image sensor acquiring the captured image and the like. In some cases, the image acquiring unit may be included in an HDR image capturing service module 190.

The display unit 151 can display an image captured by the camera unit 121 and may display an HDR processing mode setting window of the camera unit 121.

The controller 180 can include the HDR image capturing service module 190. Although the HDR image capturing service module 190 is shown as implemented within the controller 180 in FIG. 2, it can be implemented within a separate memory, the memory 170, or an external memory. The HDR image capturing service module 190 may be implemented when the HDR image capturing device 100 is shipped or when OS/firmware is upgraded.

For example, if an HDR capturing mode is inputted, the controller 180 checks whether the image acquiring unit supports HDR. If the image acquiring unit supports HDR, the controller 180 controls the image acquiring unit to perform HDR image capturing and performs HDR image processing on the captured image. If the image acquiring unit does not support HDR, the controller 180 can analyze brightness, color and focus of the acquired image and then perform HDR image processing on the captured image according to the analyzed brightness, color and focus.

Particularly, based on option information of the image acquiring unit stored in the memory 170, the controller 180 can check whether the image acquiring unit supports HDR.

When the HDR capturing mode is a moving picture capturing, if the image acquiring unit supports HDR, the controller 180 can set an exposure ratio of a long exposure to a short exposure and then control the image acquiring unit to perform HDR image capturing according to the set exposure ratio.

When the HDR capturing mode is a moving picture capturing, if the image acquiring unit does not support HDR, the controller 180 can determine a brightness value according to a brightness histogram of a preview image and then control the image acquiring unit to capture moving pictures according to the determined brightness value.

When the HDR capturing mode is a moving picture capturing, if the image acquiring unit does not support HDR, the controller 180 may determine color of a preview image according to a brightness of the preview image based on a white balance of the preview image and then re-analyze color of an image captured after determining the color of the preview image. If the color of the captured image varies, the controller 180 may make correction with the determined color.

When the HDR capturing mode is a moving picture capturing, if the image acquiring unit does not support HDR, the controller 180 may determine a focus value of a preview image based on an edge value of the preview image and then control the image acquiring unit to capture moving pictures according to the determined focus value.

Moreover, when the HDR capturing mode is a still picture capturing, if the image acquiring unit supports HDR, the controller 180 can measure a motion of the image acquiring unit, determine the number of image frames to perform HDR image processing thereon and an exposure value of each of the image frames according to an extent of the measured motion, and control the image acquiring unit to perform HDR image capturing according to the determined number of the image frames and the determined exposure value.

When the HDR capturing mode is a still picture capturing, if the image acquiring unit does not support HDR, the controller 180 can determine a brightness value according to a brightness histogram of an analyzed preview image and then control the image acquiring unit to capture a still picture according to the determined brightness value.

When the HDR capturing mode is a still picture capturing, if the image acquiring unit does not support HDR, the controller 180 can determine color of a preview image according to a brightness of the preview image based on a white balance of the preview image and then re-analyze color of an image captured after determining the color of the preview image. If the color of the captured image varies, the controller 180 may make correction with the determined color.

When the HDR capturing mode is a still picture capturing, if the image acquiring unit does not support HDR, the controller 180 can determine a focus value of a preview image based on an edge value of the preview image and then control the image acquiring unit to capture a still picture according to the determined focus value.

Moreover, if an HDR capturing mode is inputted, the controller 180 may display an HDR processing mode setting window including a multitude of HDR items sorted according to an HDR processing manner on a display screen.

If performing the HDR image processing on the captured image, the controller 180 requests a user ID. If receiving the requested user ID, the controller 180 can enable the received user ID to correspond to all HDR setting information according to performing the HDR image processing and then save it to the memory 170.

Moreover, if an HDR capturing mode is inputted, the controller 180 can request a user ID. If receiving the requested user ID, the controller 180 may provide HDR recommendation information based on HDR setting information corresponding to the received user ID.

Figure 3:
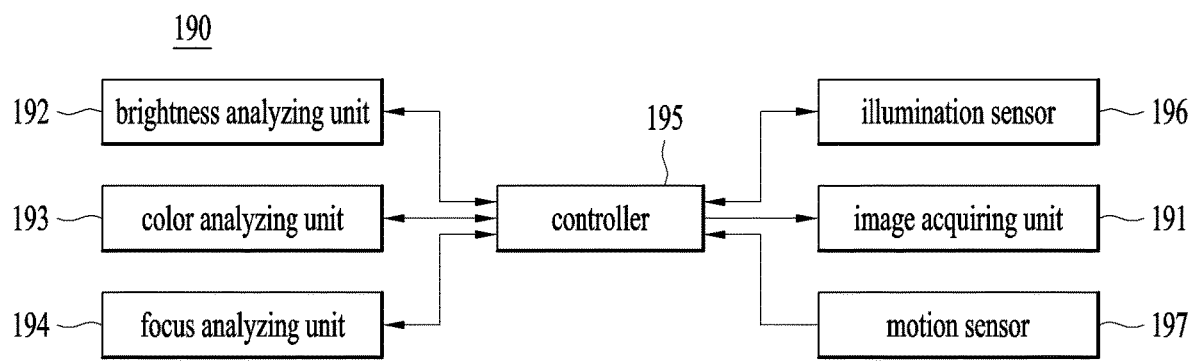
FIG. 3 is a block diagram to describe an HDR image capturing service module shown in FIG. 2.

FIG. 3 is a block diagram to describe an HDR image capturing service module shown in FIG. 2.

Referring to FIG. 3, the HDR image capturing service module 190 may include an image acquiring unit 191, a brightness analyzing unit 192, a color analyzing unit 193, a focus analyzing unit 194, a controller 195, an illumination sensor 196, a motion sensor 197, and the like.

Here, the image acquiring unit 191 plays a role in capturing to acquire a prescribed image, and may further include a camera module capturing an image, an image sensor acquiring an image and the like.

The brightness analyzing unit 192 analyzes brightness of the acquired image, the color analyzing unit 193 analyzes color of the acquired image, and the focus analyzing unit 194 analyzes focus of the acquired image. In this case, at least one of the color analyzing unit 193 and the focus analyzing unit 194 may be omitted as a necessary component. This is to consider aspects of device production reduction, power consumption reduction, downsizing and simplification.

According to an inputted High Dynamic Range (HDR) capturing mode, the controller 195 can control the image acquiring unit 191, the brightness analyzing unit 192, the color analyzing unit 193 and the focus analyzing unit 194. In some cases, the controller 195 can set exposure information for HDR capturing based on information received from the illumination sensor 196 and also set the number of image frames for HDR image processing and the like based on motion information of the camera received from the motion sensor 197.

Thus, the above-configured HDR image capturing service module 190 can implement HDR images of still and moving pictures not only in a device provided with a high-end camera capable of HDR support but also in a device provided with a low-end camera incapable of HDR support.

Moreover, the HDR image capturing service module 190 can implement an optimal HDR image irrespective of a motion of a camera or a motion of an object to capture.

FIGS. 4 to 9 are diagrams to describe an HDR image implementing process for moving pictures in an HDR image capturing device capable of supporting HDR.

Figure 4:
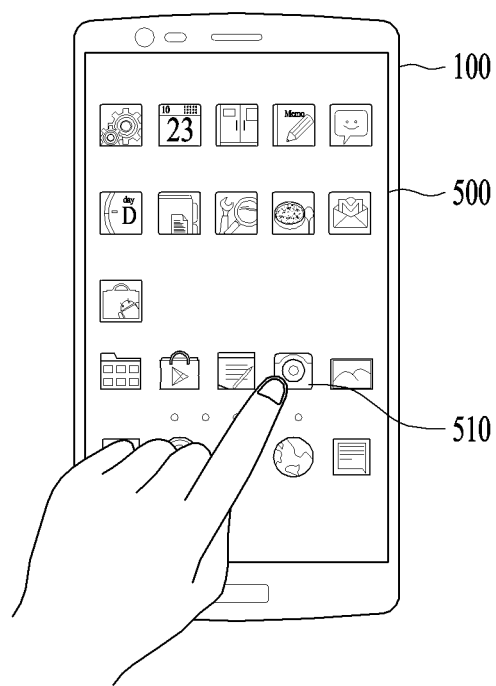
FIGS. 4 to 9 are diagrams to describe an HDR image implementing process for moving pictures in an HDR image capturing device capable of supporting HDR.

Referring to FIG. 4, if a user input of selecting a camera icon 510 displayed on a display screen 500 is received, an HDR image capturing device 100 can activate a camera, switch the display screen 500 to a camera mode, and display an image captured through the camera.

Figure 5:
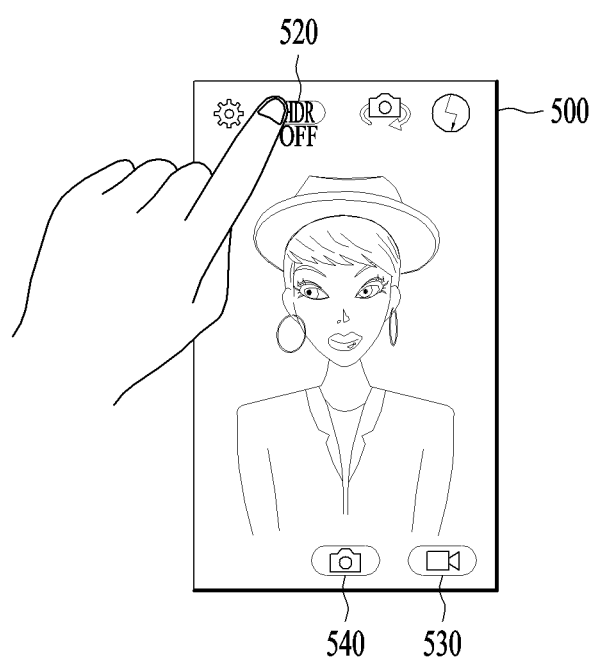

Subsequently, referring to FIG. 5, if receiving a user input of selecting an HDR capturing mode execution button 520 displayed on the display screen 500, the HDR image capturing device 100 can check whether an image acquiring unit supports HDR.

Here, the HDR image capturing device 100 includes a memory configured to store option information of the image acquiring unit. Based on the option information of the image acquiring unit stored in the memory, the HDR image capturing device 100 can check whether an image acquiring unit supports HDR.

Therefore, if the image acquiring unit supports HDR, the HDR image capturing device 100 can control the image acquiring unit to perform HDR image capturing and perform HDR image processing on the captured image.

If the image acquiring unit does not support HDR, the HDR image capturing device 100 can control a brightness analyzing unit, a color analyzing unit and focusing analyzing unit to analyze brightness, color and focus of the captured image, respectively and then perform HDR image processing on the captured image according to the analyzed brightness, color and focus.

In doing so, in response to a user input of selecting a moving picture execute button 530 or a still picture execute button 540, the HDR image capturing device 100 may perform HDR image processing in a manner corresponding to moving picture capturing or still picture capturing.

Figure 6:
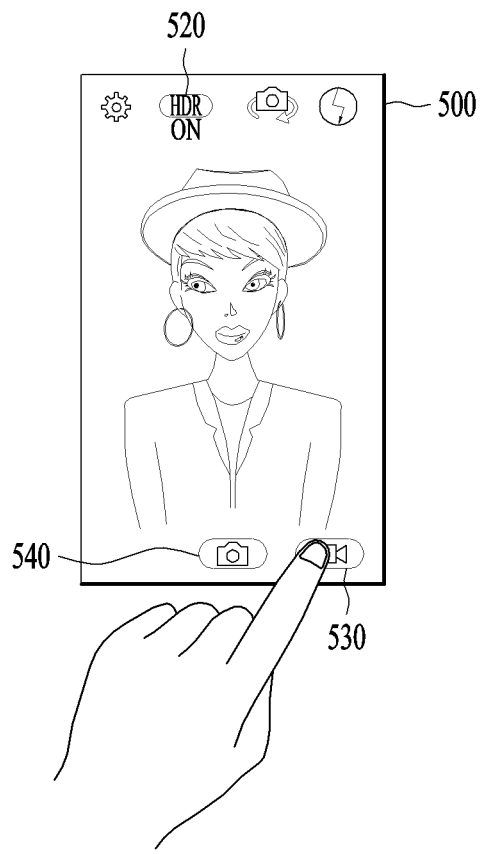

For example, referring to FIG. 6, if receiving a user input of selecting the moving picture execute button 530, the HDR image capturing device 100 can perform HDR image processing in a manner corresponding to moving picture capturing.

Figure 7:
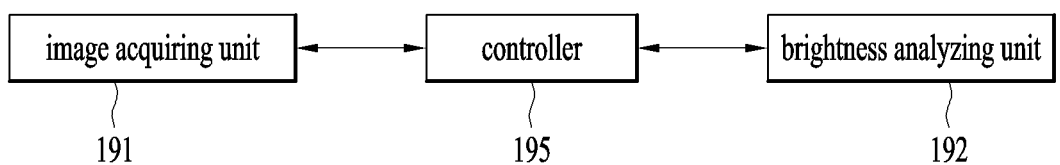

Namely, as shown in FIG. 7, when the HDR capturing mode is a moving picture capturing, if the image acquiring unit 191 supports HDR, the controller 195 of the HDR image capturing device 100 can set an exposure ratio of a long exposure to a short exposure and then control the image acquiring unit 191 to perform HDR image capturing according to the set exposure ratio.

Here, when setting the exposure ratio of the long exposure to the short exposure, the controller 195 of the HDR image capturing device 100 can set the exposure ratio according to a brightness histogram of a preview image analyzed by the brightness analyzing unit 192.

Figure 8:
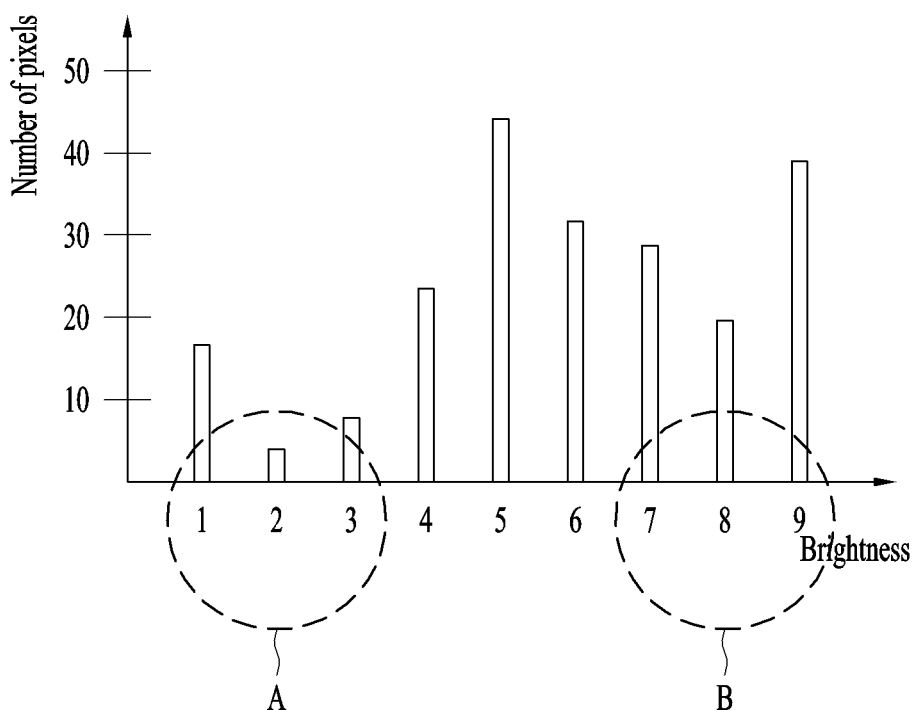

Referring to FIG. 8, if an average brightness value corresponding to a high brightness region B of a brightness histogram is greater than a first reference value, the controller 195 can set the exposure ratio in a manner that the short exposure is greater than the long exposure. If an average brightness value corresponding to a low brightness region A of the brightness histogram is smaller than a second reference value, the controller 195 can set the exposure ratio in a manner that the long exposure is greater than the short exposure.

Figure 9:
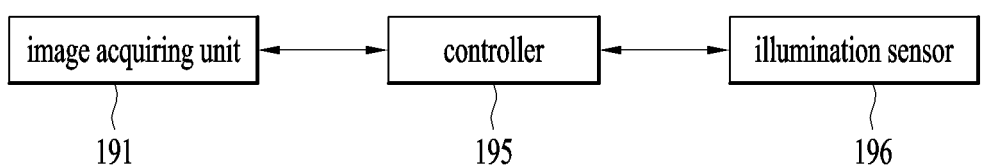

In some cases, as shown in FIG. 9, when setting the exposure ratio of the long exposure to the short exposure, the controller 195 may set the exposure ratio according to a brightness value received from the illumination sensor 196 sensing external brightness.

For example, if the external brightness value is greater than a first reference value, the exposure ratio may be set in a manner that the short exposure is greater than the long exposure. If the external brightness value is smaller than a second reference value, the exposure ratio may be set in a manner that the long exposure is greater than the short exposure.

Thus, the present invention can implement HDR images of moving pictures in a device provided with a high-end camera capable of HDR support.

Moreover, the present invention can implement an optimal HDR image irrespective of a motion of a camera or a motion of an object to capture.

Figure 10:
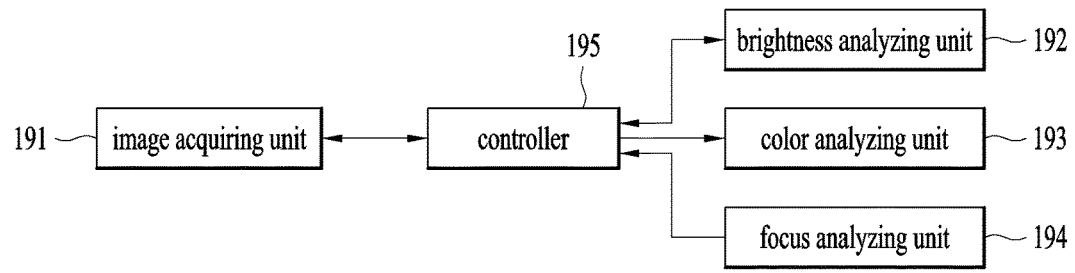
FIG. 10 is a diagram to describe an HDR image implementing process for moving pictures in an HDR image capturing device incapable of supporting HDR.

FIG. 10 is a diagram to describe an HDR image implementing process for moving pictures in an HDR image capturing device incapable of supporting HDR.

Referring to FIG. 10, when the HDR capturing mode is a moving picture capturing, if the image acquiring unit 191 does not support HDR, the controller 195 of the HDR image capturing device 100 can determine a brightness value according to a brightness histogram of a preview image analyzed by the brightness analyzing unit 192 and then control the image acquiring unit 191 to capture moving pictures according to the determined brightness value.

For example, if an average brightness value corresponding to a high brightness region of a brightness histogram is greater than a first reference value or an average brightness value corresponding to a low brightness region of the brightness histogram is smaller than a second reference value, the controller 195 determines a brightness value correspondingly. If an image is captured according to the determined brightness value, the controller 195 controls the brightness analyzing unit 192 to re-analyze a brightness of the captured image. And, based on a brightness histogram of the image reanalyzed by the brightness analyzing unit 192, the controller 195 can perform HDR image processing on the captured image.

In doing so, when performing the HDR image processing on the captured image, the controller 195 can perform local tone mapping processing of the captured image.

Namely, as a result of the analysis of the captured image, the controller 195 can perform re-correction on a region for which correction of brightness is required based on the set brightness value.

Moreover, when an HDR capturing mode is a moving picture capturing, if the image acquiring unit 181 does not support HDR, the controller 195 of the HDR image capturing device can determine color of a preview image according to a brightness of the preview image based on white balance of the preview image analyzed by the color analyzing unit 193 and control the color analyzing unit 193 to re-analyze color of an image captured after determining the color of the preview image. If the color of the captured image varies, the controller 195 can perform correction with the determined color.

Namely, as a result of the re-analysis of the captured image, the controller 195 can perform re-correction on a region for which correction of color is required based on the set color.

Moreover, when an HDR capturing mode is a moving picture capturing, if the image acquiring unit 181 does not support HDR, the controller 195 of the HDR image capturing device can determine a focus value of a preview image based on an edge value of a preview image analyzed by the focus analyzing unit 194 and control the image acquiring unit 191 to capture moving pictures according to the determined focus value.

For example, if an average edge value of a preview image is smaller than a reference value, the controller 195 can determine a corresponding focus value, control the brightness analyzing unit 192 to analyze a brightness of the captured image according to the determined focus value, and perform HDR image processing on the captured image based on a brightness histogram reanalyzed by the brightness analyzing unit 192.

In doing so, when performing the HDR image processing on the captured image, the controller 195 can perform local tone mapping processing of the captured image.

Namely, as a result of the re-analysis of the captured image, the controller 195 can perform re-correction on a region for which correction of brightness is required based on the set brightness value.

Thus, the present invention can implement HDR images of moving pictures even in a device provided with a low-end camera incapable of HDR support.

Moreover, the present invention can implement an optimal HDR image irrespective of a motion of a camera or a motion of an object to capture.

Figure 11:
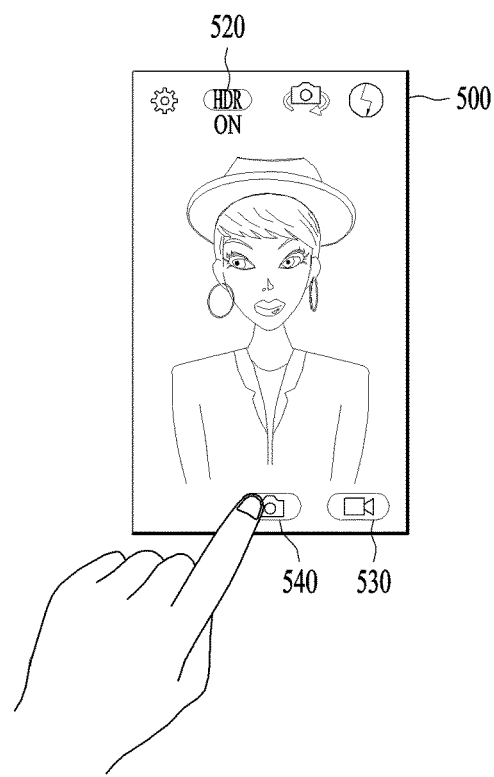
FIG. 11 and FIG. 12 are diagrams to describe an HDR image implementing process for a still picture in an HDR image capturing device capable of supporting HDR.
Figure 12:
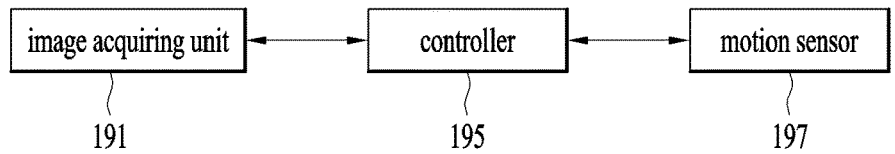

FIG. 11 and FIG. 12 are diagrams to describe an HDR image implementing process for a still picture in an HDR image capturing device capable of supporting HDR.

Referring to FIG. 11, if receiving a user input of selecting the still picture execute button 540, the HDR image capturing device 100 can perform HDR image processing in a manner corresponding to still picture capturing.

Namely, as shown in FIG. 12, when an HDR capturing mode is a still picture capturing, if the image acquiring unit 191 supports HDR, the controller 195 of the HDR image capturing device can measure a motion of the image acquiring unit 191 based on information received from the motion sensor 197 and then determine the number of image frames to perform HDR image processing thereon and an exposure value of each of the image frames according to an extent of the measured motion. Then, the controller 195 can control the image acquiring unit 191 to perform HDR image capturing according to the determined image frame number and the determined exposure value.

For example, if a measured motion extent is greater than a reference value, the controller 195 can determine the number of image frames to perform HDR image processing thereon as 1. If a measured motion extent is smaller than the reference value, the controller 195 can determine the number of image frames to perform HDR image processing thereon as a multitude. This is because, when a motion is big, if a multitude of image frames are synthesized, a HDR image quality is degraded.

Therefore, the controller 195 can increase the number of image frames to perform HDR image processing thereon if the measured motion extend becomes smaller. In this case, if the image frame number is increased too much, a synthesis speed of image frames is lowered and hardware is burdened. Hence, it is necessary to determine the image frame number in consideration of an environment of a device.

Moreover, for example, when a motion of the image acquiring unit 191 is measured, the controller 195 can measure the motion of the image acquiring unit 191 based on motion information received from the motion sensor 197 installed inside.

Thus, the present invention can implement HDR images of a still picture in a device provided with a high-end camera capable of HDR support.

Moreover, the present invention can implement an optimal HDR image irrespective of a motion of a camera or a motion of an object to capture.

Figure 13:
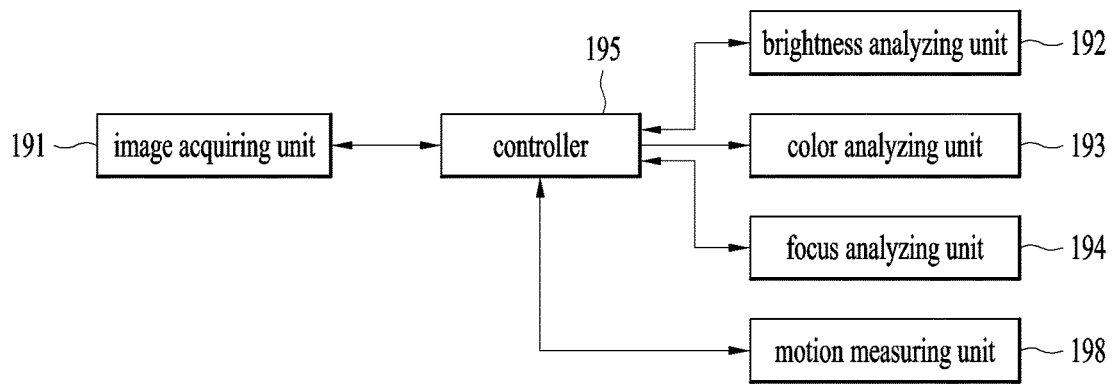
FIG. 13 is a diagram to describe an HDR image implementing process for a still picture in an HDR image capturing device incapable of supporting HDR.

FIG. 13 is a diagram to describe an HDR image implementing process for a still picture in an HDR image capturing device incapable of supporting HDR.

Referring to FIG. 13, when an HDR capturing mode is a still picture capturing, if the image acquiring unit 191 does not support HDR, the controller 195 can determine a brightness value according to a brightness histogram of a preview image analyzed by the brightness analyzing unit 192 and then control the image acquiring unit 191 to capture a still picture according to the determined brightness value.

For example, if an average brightness value corresponding to a high brightness region of a brightness histogram is greater than a first reference value or an average brightness value corresponding to a low brightness region of the brightness histogram is smaller than a second reference value, the controller 195 can determine a brightness value correspondingly.

And, if a multitude of images are captured according to the determined brightness value, the controller 195 measures a motion difference between the captured images. If the motion difference between the images is not greater than a reference value, the controller 195 can perform HDR image processing by synthesizing the captured images.

Here, if the motion difference between the images is greater than the reference value, the controller 195 can remove an image having a big motion from the captured images. This is because, if images having a big motion difference are synthesized together, the HDR image quality is degraded.

Moreover, when an HDR capturing mode is a still picture capturing, if the image acquiring unit 181 does not support HDR, the controller 195 can determine color of a preview image according to a brightness of the preview image based on white balance of the preview image analyzed by the color analyzing unit 193 and control the color analyzing unit 193 to re-analyze color of an image captured after determining the color of the preview image. If the color of the captured image varies, the controller 195 can perform correction with the determined color.

Namely, as a result of the re-analysis of the captured image, the controller 195 can perform re-correction on a region for which correction of color is required based on the set color.

Moreover, when an HDR capturing mode is a still picture capturing, if the image acquiring unit 181 does not support HDR, the controller 195 can determine a focus value of a preview image based on an edge value of a preview image analyzed by the focus analyzing unit 194 and control the image acquiring unit 191 to capture a still picture according to the determined focus value.

For example, if an average edge value of a preview image is smaller than a reference value, the controller 195 can determine a corresponding focus value. If a multitude of images are captured according to the determined focus value, the controller 195 can measure a motion difference between the captured images. If the motion difference between the images is not greater than a reference value, the controller 195 can perform HDR image processing by synthesizing the captured images.

Here, if the motion difference between the images is greater than the reference value, the controller 195 can remove an image having a big motion from the captured images. This is because, if images having a big motion difference are synthesized together, the HDR image quality is degraded.

Figure 14:
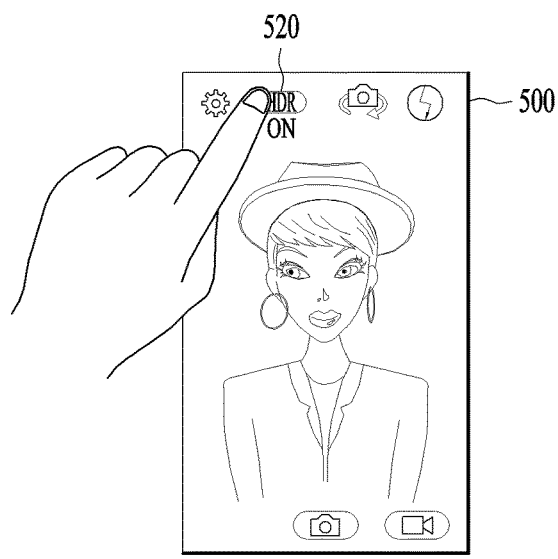
FIGS. 14 to 16 are diagrams to describe an HDR processing mode setting process using an HDR processing mode setting window.
Figure 15:
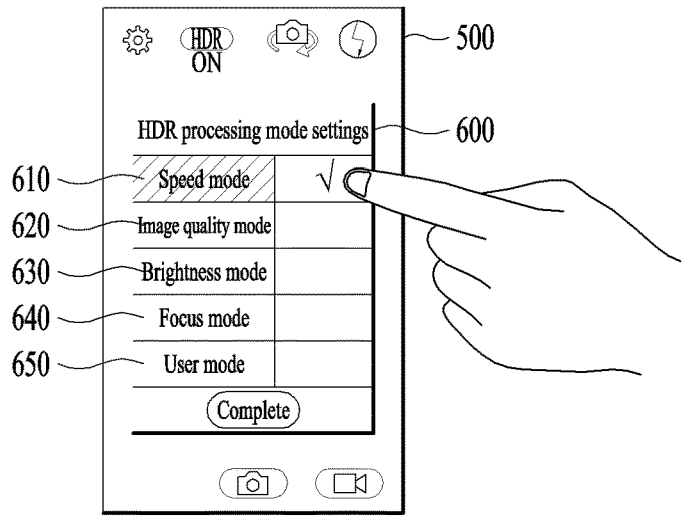
Figure 16:
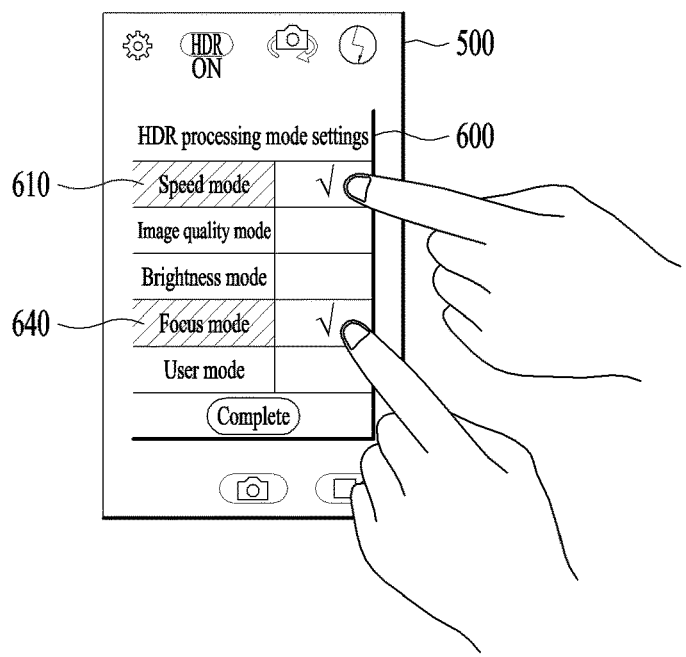

FIGS. 14 to 16 are diagrams to describe an HDR processing mode setting process using an HDR processing mode setting window.

Referring to FIG. 14, if receiving a user input of selecting an HDR capturing mode execution button 520 displayed on the display screen 500, a controller of an HDR image capturing device can check whether an image acquiring unit supports HDR.

Here, the controller includes a memory configured to store option information of the image acquiring unit. Based on the option information of the image acquiring unit stored in the memory, the controller can check whether the image acquiring unit supports HDR.

Therefore, if the image acquiring unit supports HDR, the controller can control the image acquiring unit to perform HDR image capturing and perform HDR image processing on the captured image.

If the image acquiring unit does not support HDR, the controller can control a brightness analyzing unit, a color analyzing unit and focusing analyzing unit to analyze brightness, color and focus of the captured image, respectively and then perform HDR image processing on the captured image according to the analyzed brightness, color and focus.

Subsequently, referring to FIG. 15, as an HDR capturing mode is inputted, if the controller confirms a presence or non-presence of HDR support of the image acquiring unit, the controller can display an HDR processing mode setting window 600, which includes a multitude of HDR items sorted according to an HDR processing manner, on the display screen 500.

Here, the HDR processing mode setting window 600 can include a speed mode item 610, an image quality mode item 620, a brightness mode item 630, a focus mode item 640 and a user mode item 650.

If a user input of selecting the speed mode item 610 from the HDR processing mode setting window 600 is received, the controller can perform HDR image processing in a processing manner corresponding to the speed mode.

For example, in the processing manner corresponding to the speed mode, HDR image processing is performed on a single image frame only, whereby a processing speed can be raised.

As the image quality mode item 620 is selected from the HDR processing mode setting window 600, if an image quality is inputted, the controller performs HDR image processing on a multitude of image frames, thereby improving an image quality.

As the brightness mode item 630 is selected from the HDR processing mode setting window 600, if a brightness mode is inputted, the controller performs HDR image processing on a multitude of image frames captured according to a preset specific brightness value, thereby improving image brightness.

As the focus mode item 640 is selected from the HDR processing mode setting window 600, if a focus mode is inputted, the controller performs HDR image processing on a multitude of image frames captured with a preset specific focus value, thereby improving an image focus.

As the user mode item 650 is selected from the HDR processing mode setting window 600, if a user mode is selected, the controller performs HDR image processing on a multitude of image frames captured based on the image frame number, color, brightness and focus set by a user, thereby improving user convenience.

In some implementations, as shown I FIG. 16, if a multitude of items are selected from the HDR processing mode setting window 600, the controller may simultaneously perform HDR image processing corresponding to a multitude of the items.

For example, if the speed mode item 610 and the focus mode item 640 are selected together from the HDR processing mode setting window 600, the controller performs HDR image processing on a single image frame captured with a preset specific focus value, thereby improving a processing speed and a focus.

Figure 17:
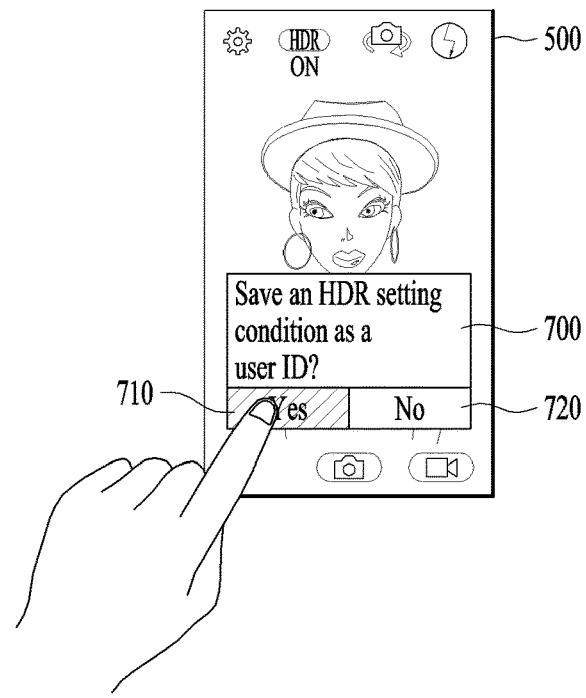
FIGS. 17 to 19 are diagrams to describe a process for storing HDR setting conditions per user.
Figure 18:
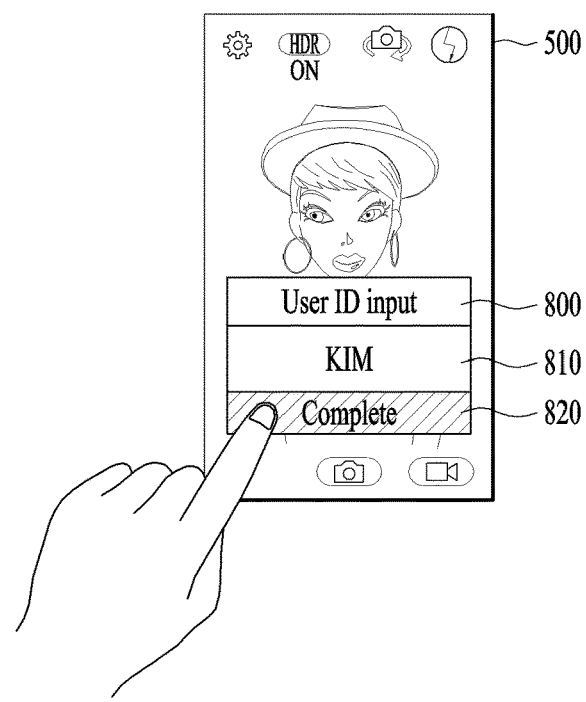
Figure 19:
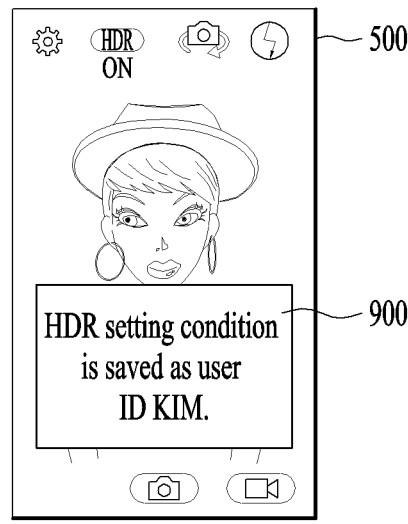

FIGS. 17 to 19 are diagrams to describe a process for storing HDR setting conditions per user.

Referring to FIGS. 17 to 19, if performing HDR image processing on a captured image, a controller of an HDR image capturing device requests a user ID. If the requested user ID is received, the controller can match the received user ID with all HDR setting information according to performing the HDR image processing and then save it to a memory.

This is because, in case of storing HDR setting information per user ID, it is able to analyze a user's HDR capturing type. Hence, it is able to provide user convenience for providing a user with recommendation information.

For example, as shown in FIG. 17, if performing HDR image processing on a captured image, the controller can request a user ID.

In this case, the controller can display a query message window 700, which queries that an HDR setting condition will be saved as a user ID, on a display screen 500.

Here, in the query message 700, a button 'Yes' 710 for approving a query and a button 'No' 720 for declining the query can be included.

Subsequently, if receiving a user input of selecting the button 'Yes', as shown in FIG. 18, the controller can display a user ID input window 800 on the display screen 500.

Here, in the user ID input window 800, a user ID input field 810 and a user ID input complete button 820 can be included.

If a user ID is inputted to the user ID input field 810 and a user input of selecting the user ID input complete button 820 is received, the controller can match the received user ID with all HDR setting information according to performing HDR image processing and then save it to the memory.

And, as shown in FIG. 19, the controller can display a notification message window 900, which indicates that the HDR setting condition is saved as the user ID, on the display screen.

Thus, the present invention saves all HDR setting information according to performing HDR image processing per user and then provides a user with HDR recommendation information based on the saved information, thereby providing user convenience.

Figure 20:
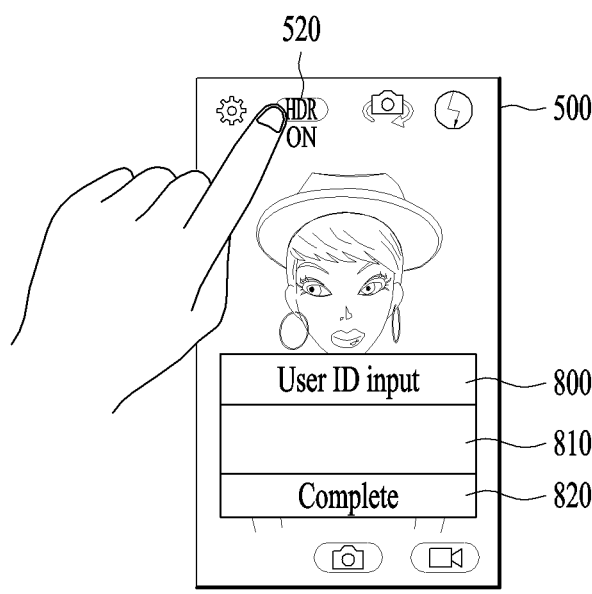
FIGS. 20 to 22 are diagrams to describe a process for providing HDR recommendation information.
Figure 21:
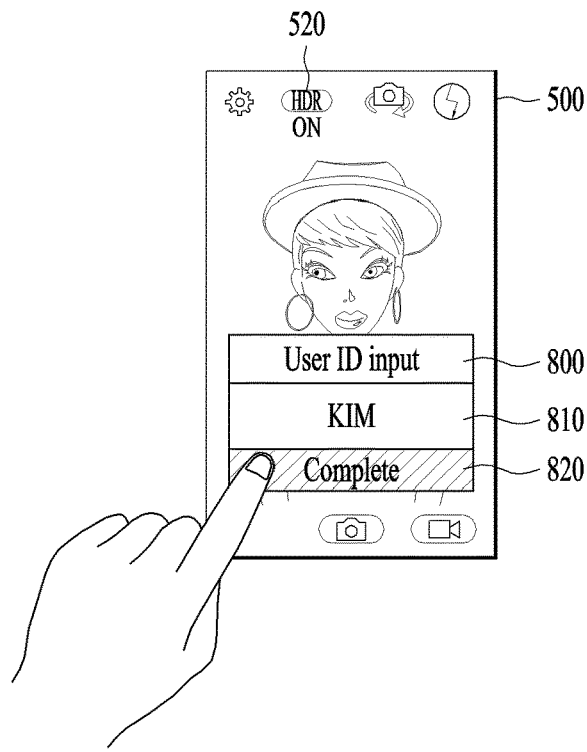
Figure 22:
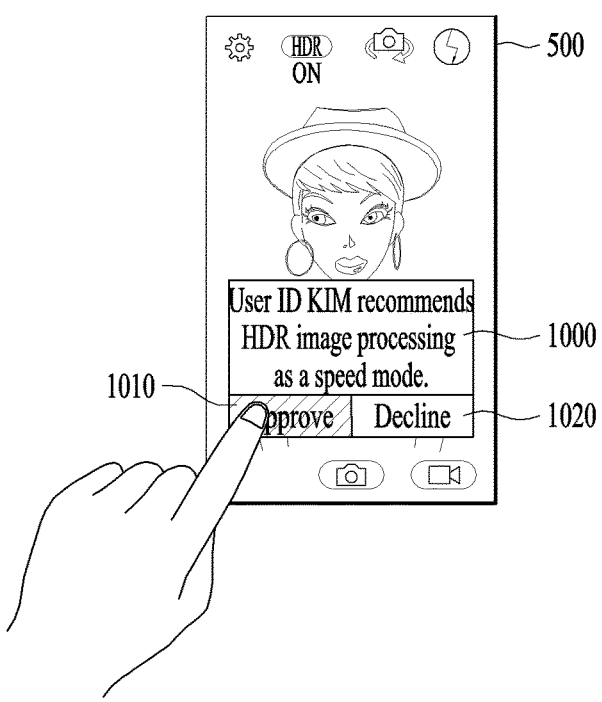

FIGS. 20 to 22 are diagrams to describe a process for providing HDR recommendation information.

Referring to FIGS. 20 to 22, if performing HDR image processing on a captured image, a controller of an HDR image capturing device can match the received user ID with all HDR setting information according to performing HDR image processing and then save it to a memory.

If an HDR capturing mode is inputted, the controller requests a user ID. If receiving the requested user ID, the controller can provide HDR recommendation information based on HDR setting information corresponding to the received user ID.

Referring to FIG. 20, if receiving a user input of selecting an HDR capturing mode execute button 520 displayed on a display screen 500, the controller can display a user ID input window 800 on the display screen 500.

Here, in the user ID input window 800, a user ID input field 810 and a user ID input complete button 820 can be included.

Subsequently, referring to FIG. 21, if a user ID is inputted to the user ID input field 810 and a user input of selecting the user ID input complete button 820 is received, the controller can recognize an HDR processing manner, a habit, a preferred setting condition and the like of a user by analyzing HDR setting information corresponding to the received user ID.

And, as shown in FIG. 22, the controller can provide a most advantageous HDR recommendation to the user.

For example, as shown in FIG. 22, the controller can display a recommendation message window 1000, which recommends HDR image processing in speed mode to the user, on the display screen.

Here, in the recommendation message window 1000, an approve button 1010 for approving HDR recommendation information and a decline button 1020 for declining HDR recommendation information can be included.

Subsequently, if the user selects the approve button 1010 for approving the HDR recommendation information, the controller can perform HDR image processing on the capturing condition set to the speed mode.

Thus, the present invention saves all HDR setting information according to performing HDR image processing per user and then provides a user with HDR recommendation information based on the saved information, thereby providing user convenience.

FIGS. 23 to 26 are flowcharts to describe a method of controlling an HDR image capturing device according to the present invention.

Figure 23:
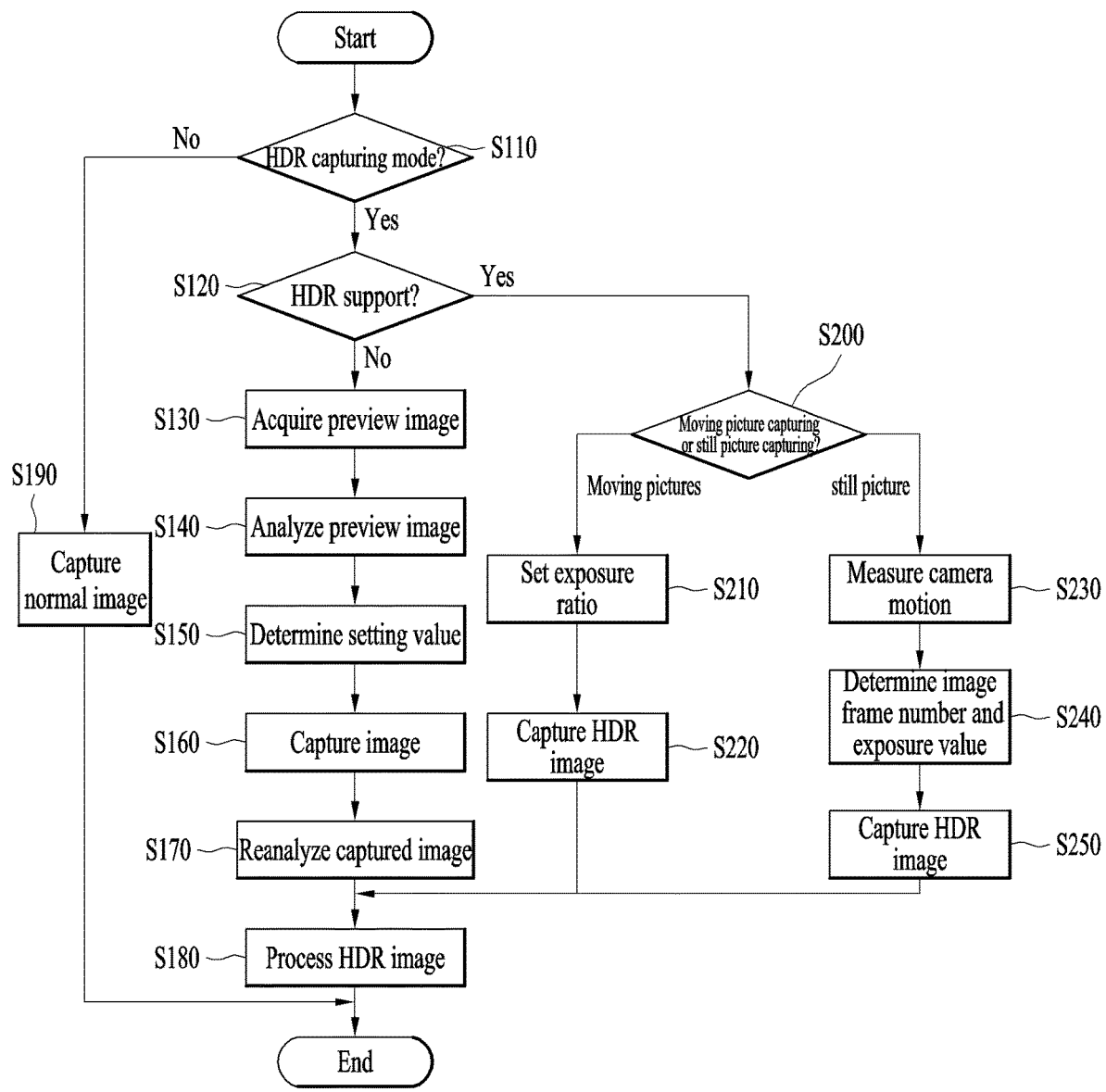
FIGS. 23 to 26 are flowcharts to describe a method of controlling an HDR image capturing device according to the present invention.

Referring to FIG. 23, the controller checks whether an HDR capturing mode is inputted [S110].

If the HDR capturing mode is not inputted, the controller can recognize it as a normal image capturing mode and then perform a normal image capturing [S190].

If the HDR capturing mode is inputted, the controller checks whether the image acquiring unit supports HDR [S120].

In doing so, the controller can check whether the image acquiring unit supports HDR on the basis of option information of the image acquiring unit stored in the memory.

If the image acquiring unit does not support HDR, the controller acquires a preview image [S130] and then analyzes brightness, color and focus of the acquired preview image [S140].

Subsequently, based on the analyzed information, the controller determines setting values for brightness, color and focus [S150].

According to the determined setting values, the controller captures an image [S160] and then re-analyzes the captured image [S170].

Subsequently, the controller performs HDR image processing on the re-analyzed image [S180].

Meanwhile, if the image acquiring unit supports HDR in the step S120 of checking whether the image acquiring unit supports HDR, the controller checks whether an HDR capturing mode is a moving picture capturing or a still picture capturing [S200].

If the HDR capturing mode is the moving picture capturing, the controller sets an exposure ratio of a long exposure to a short exposure [S210] and then performs an HDR image capturing according to the set exposure ratio [S220].

Yet, if the HDR capturing mode is a still picture capturing, the controller measures a motion of the image acquiring unit [S230].

Then, the controller determines the number of image frames to perform HDR image processing thereon according to an extent of the measured motion and an exposure value of each of the image frames [S240].

Subsequently, according to the determined image frame number and the determined exposure value, the controller performs HDR image capturing [S250].

Figure 24:
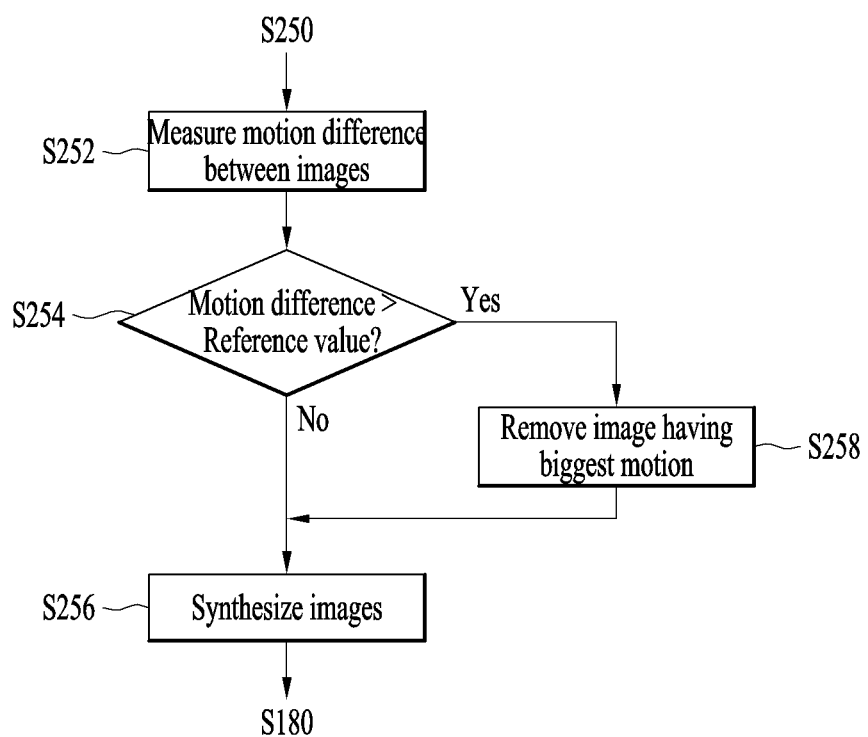

Referring to FIG. 24, if a multitude of images are captured in the step S250 of performing the HDR image capturing, the controller measures a motion difference between the captured images [S252].

The controller checks whether the motion difference between the images is greater than a reference value [S254].

If the motion difference between the images is not greater than the reference value, the controller can perform HDR image processing by synthesizing the captured images [S256].

Yet, if the motion difference between the images is greater than the reference value, the controller can remove an image having a biggest motion among the captured images [S258].

Figure 25:
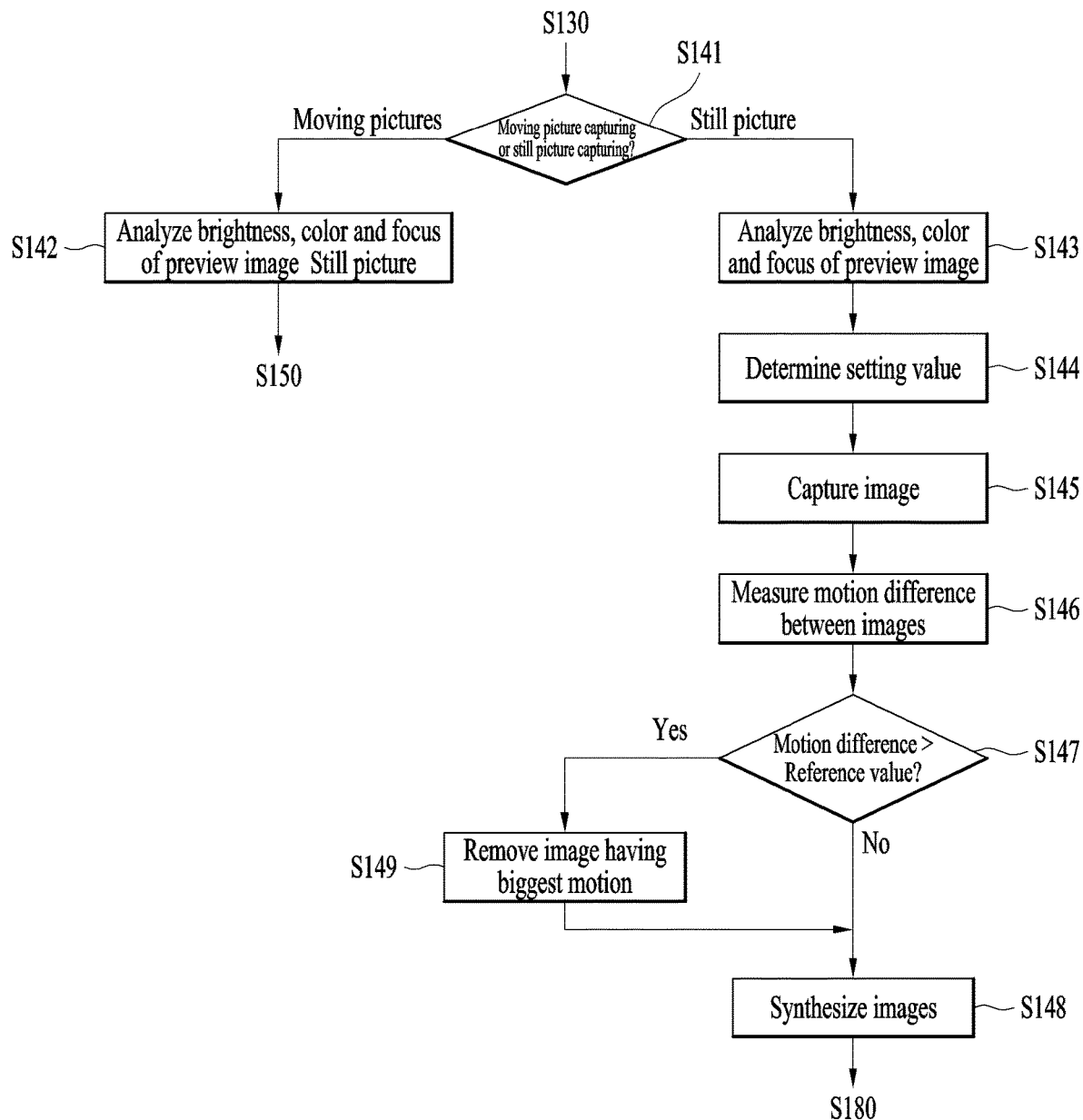

In some implementations, as shown in FIG. 25, if the image acquiring unit supports HDR in the step S140 of analyzing the brightness, color and focus of the acquired preview image, the controller checks whether the HDR capturing mode is a moving picture capturing or a still picture capturing [S141].

If the HDR capturing mode is the moving picture capturing, the controller analyzes brightness using a brightness histogram of the preview image, analyzes color of the preview image according to the brightness of the preview image based on white balance of the preview image, and analyzes focus of the preview image based on an edge value of the preview image [S142].

Yet, if the HDR capturing mode is the still picture capturing, the controller analyzes brightness using a brightness histogram of the preview image, analyzes color of the preview image according to the brightness of the preview image based on white balance of the preview image, and analyzes focus of the preview image based on an edge value of the preview image [S143].

Subsequently, based on the analyzed information, the controller determines setting values for the brightness, color and focus [S144].

According to the determined setting values, the controller captures images [S145] and measures a motion difference between the captured images [S146].

Then, the controller checks whether the motion difference between the images is greater than a reference value [S147].

Subsequently, if the motion difference between the images is not greater than the reference value, the controller performs HDR image processing by synthesizing the captured images [S148].

Yet, if the motion difference between the images is greater than the reference value, the controller can remove an image having a big motion from the captured images [S149].

Figure 26:
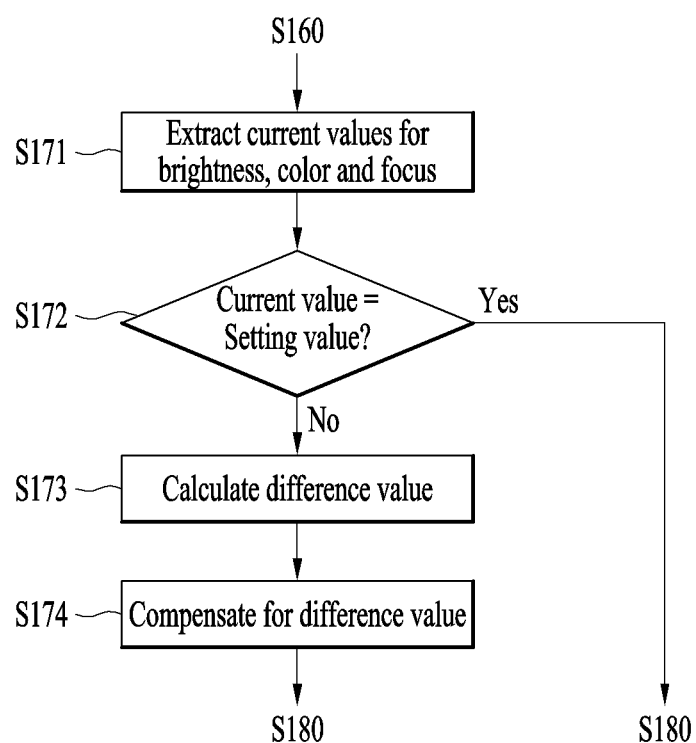

Moreover, as shown in FIG. 26, in the step S180 of re-analyzing the captured image and performing HDR image processing on the re-analyzed image, the controller extracts the current value for the brightness, color and focus by re-analyzing the brightness, color and focus of the captured image [S171].

Subsequently, the controller compares the extracted current value with the determined setting value to check whether they are equal to each other [S172].

As a result of the comparison, if the current value and the setting value are different from each other, the controller finds a difference value between them [S173] and then performs HDR image processing by compensating the captured image for the difference value [S174].

Yet, if the current value and the setting value are equal to each other, the controller can directly perform HDR image processing without the compensation for the difference value.

Thus, the present invention can implement an optimal HDR image according to a camera motion extent irrespective of HDR support, thereby being applicable to a low-end image capturing device.

The present invention can increase an HDR image implementing speed and minimize memory and power consumption, by determining the number of image frames for HDR image implementation according to a camera movement extent.

The present invention can implement an optimal HDR image in a manner of removing an image frame having a big motion after measuring a motion difference between captured image frames.

The present invention can implement an optimal HDR image in a manner of determining an optimal setting value by analyzing brightness, color and focus of a preview image and then reanalyzing a captured image according to the determined setting value.

As HDR image implementation is enabled automatically or manually in a manner of displaying an HDR processing mode setting window including a multitude of HDR items sorted by HDR processing manners on a display screen, the present invention can provide user convenience.

The present invention can provide user convenience in a manner of storing all HDR setting informations according to HDR image processing results per user and then providing HDR recommendation information to a user based on the stored informations.

MODE FOR INVENTION

An apparatus for capturing HDR images and control method thereof according to the present invention can be configured by combination of structural elements and features of the present invention. The structural elements or features may be considered selectively unless specified separately, and combined with one another to enable various modifications of the embodiments of the present invention entirely or in part.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents. And, such modifications and variations should not be individually understood from the technical idea or prospect of the present invention.

INDUSTRIAL APPLICABILITY

The present invention relates to an apparatus for capturing HDR images and control method thereof and has industrial applicability.

What is claimed is:

1. An apparatus for capturing High Dynamic Range (HDR) images, the apparatus comprising:
   an image acquiring unit configured to acquire a prescribed image;
   a brightness analyzing unit configured to analyze a brightness of the acquired image;
   a color analyzing unit configured to analyze a color of the prescribed image;
   a focus analyzing unit configured to analyze a focus of the prescribed image; and
   a controller configured to control the image acquiring unit, the brightness analyzing unit, the color analyzing unit, and the focus analyzing unit according to an HDR capturing mode,
   wherein the controller is further configured to:
   check whether the image acquiring unit has HDR support when the HDR capturing mode is input,
   in response to the image acquiring unit having the HDR support, control the image acquiring unit to perform HDR image capturing and perform HDR image processing on the prescribed image, and
   in response to the image acquiring unit lacking the HDR support, control the brightness analyzing unit, the color analyzing unit and the focus analyzing unit to analyze brightness, color and focus of the prescribed image, and perform the HDR image processing on the prescribed image according to the analyzed brightness, color and focus,
   wherein the controller is further configured to:
   in response to the HDR capturing mode being set to a still picture capturing mode and the image acquiring unit having the HDR support, measure a motion of the image acquiring unit, determine a number of image frames to perform the HDR image processing thereon and an exposure value of each of the image frames according to an extent of the measured motion, and control the image acquiring unit to perform HDR image capturing according to the determined number of image frames and the determined exposure value,
   wherein the controller is further configured to:
   determine whether the measured motion extent is greater than a reference value,
   in response to the measuring motion extending being greater than the reference value, set the number of the image frames to perform the HDR image processing thereon to one, and
   in response to the measured motion extent being less than the reference value, set the number of the image frames to perform the HDR image processing thereon to a number greater than one, and
   wherein the controller measures the motion of the image acquiring unit based on motion information received from a motion sensor installed inside the apparatus.

2. The apparatus of claim 1, further comprising:
   a memory configured to store option information of the image acquiring unit,
   wherein the controller is further configured to check whether the image acquiring unit has the HDR support based on the option information of the image acquiring unit stored in the memory.

3. The apparatus of claim 1, wherein the controller is further configured to:
   in response to the HDR capturing mode being set to a moving picture capturing mode and the image acquiring unit having the HDR support, set an exposure ratio of a long exposure to a short exposure and control the image acquiring unit to perform the HDR image capturing according to the set exposure ratio.

4. The apparatus of claim 3, wherein the controller sets the exposure ratio of the long exposure to the short exposure according to a brightness histogram of a preview image analyzed by the brightness analyzing unit.

5. The apparatus of claim 4, wherein the controller is further configured to:
   in response to an average brightness value corresponding to a high-brightness region of the brightness histogram being greater than a first reference value, set the exposure ratio in a manner that the short exposure is greater than the long exposure, and in response to the average brightness value corresponding to a low-brightness region of the brightness histogram being less than a second reference value, set the exposure ratio in a manner that the long exposure is greater than the short exposure.

6. The apparatus of claim 1, wherein the controller is further configured to:

in response to the HDR capturing mode being set to a moving picture capturing mode and the image acquiring unit lacking the HDR support, determine a brightness value according to a brightness histogram of a preview image analyzed by the brightness analyzing unit and control the image acquiring unit to capture moving pictures according to the determined brightness value.

7. The apparatus of claim 6, wherein the controller is further configured to:

in response to an average brightness value corresponding to a high-brightness region of the brightness histogram being greater than a first reference value or the average brightness value corresponding to a low-brightness region of the brightness histogram being less than a second reference value, determine the brightness value correspondingly, and in response to an image being captured according to the determined brightness value, control the brightness analyzing unit to re-analyze a brightness of the captured image, and perform the HDR image processing on the captured image based on a brightness histogram of the captured image re-analyzed by the brightness analyzing unit.

8. The apparatus of claim 7, wherein the controller performs a local tone mapping processing of the captured image when performing the HDR image processing on the captured image.

9. The apparatus of claim 1, wherein the controller is further configured to:

in response to the HDR capturing mode being set to a moving picture capturing mode and the image acquiring unit lacking the HDR support, determine a color of a preview image according to a brightness of the preview image based on a white balance of the preview image analyzed by the color analyzing unit, control the color analyzing unit to re-analyze a color of an image captured after determining the color of the preview image, and perform correction with the determined color when the color of the capture image varies.

10. The apparatus of claim 1, wherein the controller is further configured to:

in response to the HDR capturing mode being set to a moving picture capturing mode and the image acquiring unit lacking the HDR support, determine a focus value of a preview image based on an edge value of the preview image analyzed by the focus analyzing unit and control the image acquiring unit to capture moving pictures according to the determined focus value.

11. The apparatus of claim 10, wherein the controller is further configured to:

in response to an average edge value of the preview image being less than a reference value, determine a focus value correspondingly, control the brightness analyzing unit to analyze a brightness of the captured image according to the determined focus value, and perform the HDR image processing on the captured image based on a brightness histogram analyzed by the brightness analyzing unit.

12. The apparatus of claim 11, wherein the controller performs a local tone mapping processing of the captured image when performing the HDR image processing on the captured image.

13. The apparatus of claim 1, wherein the controller is further configured to:

in response to the HDR capturing mode being set to a still picture capturing mode and the image acquiring unit lacking the HDR support, determine a brightness value according to a brightness histogram of a preview image analyzed by the brightness analyzing unit and control the image acquiring unit to capture a still picture according to the determined brightness value.

14. The apparatus of claim 1, wherein the controller is further configured to:

in response to an average brightness value corresponding to a high-brightness region of the brightness histogram being greater than a first reference value or an average brightness value corresponding to a low-brightness region of the brightness histogram being less than a second reference value, determine a brightness value correspondingly, and in response to a multitude of images being captured according to the determined brightness value, measure a motion difference between the captured multitude of images, and in response to the motion difference between the captured multitude of images being less than or equal to a reference value, perform the HDR image processing by synthesizing the captured multitude of images.

15. The apparatus of claim 14, wherein the controller removes an image having a large amount of motion from among the captured multitude of images.

16. The apparatus of claim 1, wherein the controller is further configured to:

in response to the HDR capturing mode being set to a still picture capturing mode and the image acquiring unit lacking the HDR support, determine a color of a preview image according to a brightness of the preview image based on a white balance of the preview image analyzed by the color analyzing unit and control the color analyzing unit to re-analyze a color of an image captured after determining the color of the preview image, and perform correction with the determined color when the color of the captured image varies.

17. The apparatus of claim 1, wherein the controller is further configured to:

in response to the HDR capturing mode being set to a still picture capturing mode and the image acquiring unit lacking the HDR support, determine a focus value of a preview image based on an edge value of the preview image analyzed by the focus analyzing unit and control the image acquiring unit to capture a still image according to the determined focus value.

18. The apparatus of claim 1, wherein the controller is further configured to:

capture a multitude of images, measure a motion difference between the captured multitude of images, and remove an image having an amount of motion greater than a set value from the captured multitude of images to generate a sub-set of images from the captured multitude of images, and perform the HDR image processing by synthesizing the sub-set of images.

19. An apparatus for capturing High Dynamic Range (HDR) images, the apparatus comprising:
an image acquiring unit configured to acquire a prescribed image;
an analyzing unit configured to analyze a brightness, a color and a focus of the acquired image; and
a controller configured to control the analyzing unit according to an HDR capturing mode,
wherein the controller is further configured to:
check whether the image acquiring unit has HDR support when the HDR capturing mode is input,
in response to the image acquiring unit having the HDR support, control the image acquiring unit to perform HDR image capturing and perform HDR image processing on the prescribed image,
in response to the image acquiring unit lacking the HDR support, control the analyzing unit to analyze brightness, color and focus of the prescribed image, and perform the HDR image processing on the prescribed image according to the analyzed brightness, color and focus, and
in response to the HDR capturing mode being set to a still picture capturing mode and the image acquiring unit having the HDR support, measure a motion of the image acquiring unit, determine a number of image frames to perform the HDR image processing thereon and an exposure value of each of the image frames according to an extent of the measured motion, and control the image acquiring unit to perform HDR image capturing according to the determined number of image frames and the determined exposure value; and
wherein the controller is further configured to:
capture a multitude of images,
measure a motion difference between the captured multitude of images,
remove an image having an amount of motion greater than a set value from the captured multitude of images to generate a sub-set of images from the captured multitude of images, and
perform the HDR image processing by synthesizing the sub-set of images.

20. The apparatus of claim 19, further comprising:
a memory configured to store option information of the image acquiring unit,
wherein the controller is further configured to check whether the image acquiring unit has the HDR support based on the option information of the image acquiring unit stored in the memory.

* * * * *